United States Patent [19]

Koyabu

[11] 4,427,370
[45] Jan. 24, 1984

[54] METHOD OF TREATING RAW MATERIALS IN AN IRON REDUCTION PROCESS

[75] Inventor: Yukio Koyabu, Niihama, Japan

[73] Assignee: Sumitomo Heavy Industries, Ltd., Tokyo, Japan

[21] Appl. No.: 347,671

[22] Filed: Feb. 10, 1982

[30] Foreign Application Priority Data

Feb. 19, 1981 [JP] Japan .............................. 56-22424[U]
Feb. 20, 1981 [JP] Japan .................... 56-24044

[51] Int. Cl.³ .................... F27D 5/00; F27D 15/00; C21B 7/00
[52] U.S. Cl. ........................................ 432/5; 266/142; 266/143; 414/160; 432/62; 432/86; 432/239
[58] Field of Search ...................... 432/5, 62, 239, 86; 266/142, 143; 414/160

[56] References Cited
U.S. PATENT DOCUMENTS 3,452,971 7/1969 Rinesch ................................ 266/143
3,819,161 6/1974 Hubatsch ........................... 266/143
4,106,894 8/1978 Bobleter et al. ......................... 432/5

Primary Examiner—John J. Camby
Attorney, Agent, or Firm—Flynn, Thiel, Boutell & Tanis

[57] ABSTRACT

A method of treating, in a vertical grate furnace, raw materials in an iron reduction process is disclosed. The raw materials are fed onto a grate-containing section which is separated from at least one other section of the grate furnace. Subsequently, the grate-containing section is attached to the other section or sections by moving the other section or sections upwardly or downwardly so as to achieve and maintain gastight conditions between the grate-containing section and the other section(s). The raw materials then undergo preliminary heat treatment in the grate furnace. Finally, the grate is tilted to discharge the treated materials from the grate furnace through an outlet provided on the side wall of the furnace.

7 Claims, 8 Drawing Figures

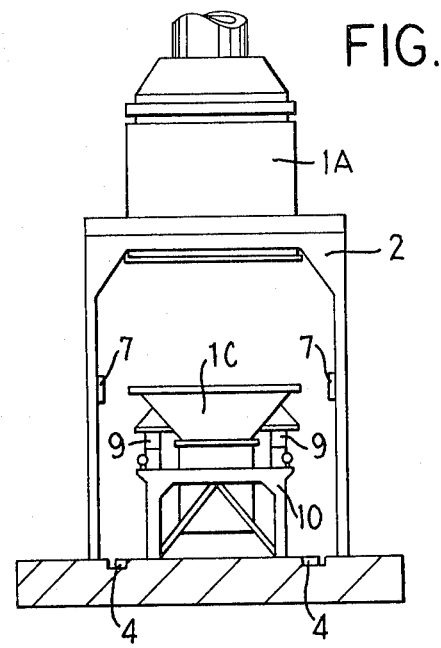
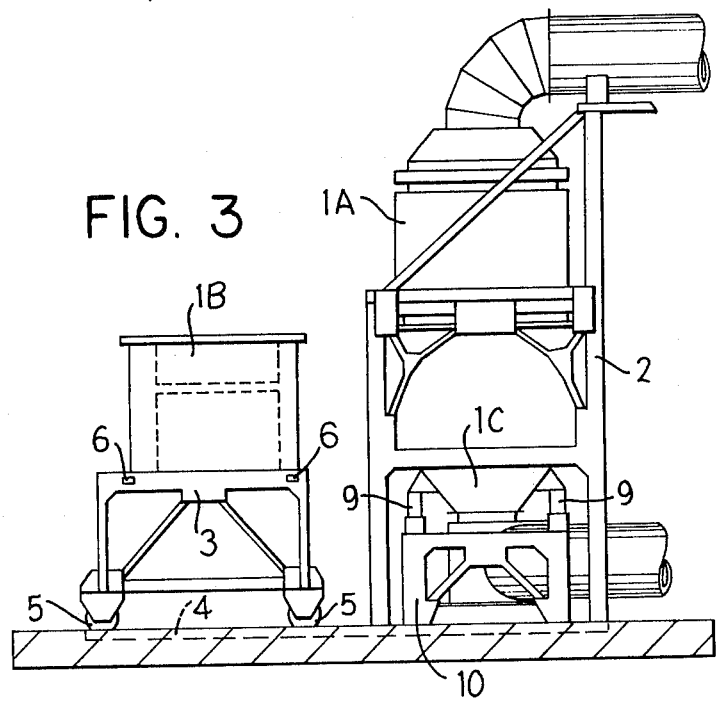

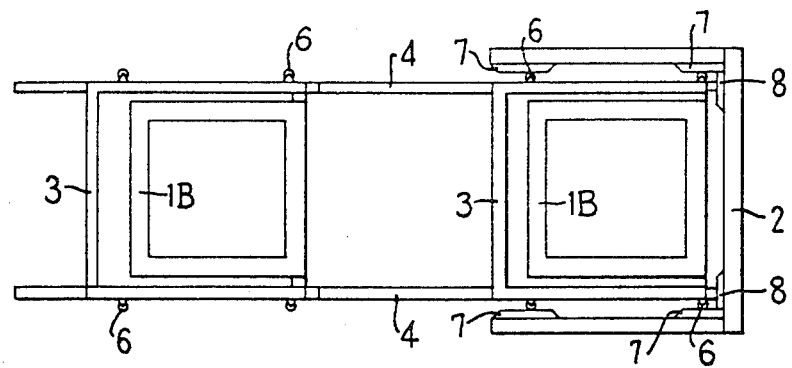
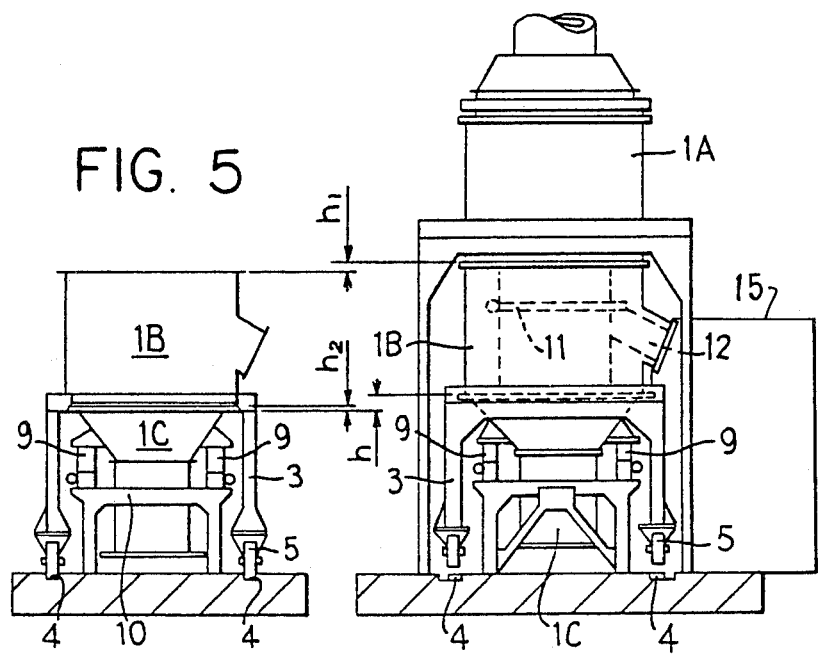

METHOD OF TREATING RAW MATERIALS IN AN IRON REDUCTION PROCESS

This invention relates to a method of treating the raw materials in an iron ore reduction process and to an apparatus for practicing said method. More particularly, this invention relates to a method of feeding the raw materials into a vertical grate furnace, heating the same therein and discharging the same therefrom.

In the conventional method of feeding raw materials into a vertical grate furnace, there are employed operations and devices requiring considerable time and labor, such as for securing bolts, because the upper part of the grate must be removed or must be drawn out of the furnace to permit the feeding of raw materials.

The present invention has been devised in light of the above-described circumstances.

An object of the present invention is to provide a method and apparatus by which a rapid and simple material feeding operation can be achieved.

In the method of the present invention, the vertical grate furnace is divided into, for example, three sections, i.e., upper, intermediate and lower sections. After at least one of either the upper section or the lower section is moved vertically away from the intermediate section, the intermediate section is moved laterally to a location at the side of the furnace whereat it is supplied with raw materials which are placed on the grate in the intermediate section. Subsequent to the feeding operation, the intermediate section, charged with raw materials, is moved back into the gap between the upper and lower sections, whereupon at least one of the upper or lower sections is moved vertically so that the intermediate section is integrally fitted to the upper or lower sections. This permits the material feeding operation to be accomplished rapidly and easily.

In the apparatus of the present invention, the vertical grate furnace is divided into three sections as set forth in the above description concerning the method of the present invention.

The support apparatus of the present invention comprises a stationary frame for fixedly supporting the upper section and having sufficient space to receive the intermediate section and the lower section and the supports therefor, a traveling support supporting the intermediate section which support is reciprocable between a location directly below the upper section and a position located sidewardly of the furnace, and a lower support equipped with a lift for moving the lower section vertically. Accordingly, despite the relatively simple structural arrangement of the type described, the feeding operation can be carried out in rapid and simple fashion.

The invention, both as to its organization and method of operation, together with further objects and advantages thereof, can best be understood by reference to the following description, taken in connection with the accompanying drawings, in which:

FIG. 2 and FIG. 3 are a side view and an elevational view, respectively, showing the material feeding apparatus of the present invention wherein the intermediate section is removed from the stationary frame;

FIG. 4 is a plan view of the material feeding apparatus shown in FIG. 3;

FIG. 5 is a side view showing the apparatus in a position wherein the intermediate section has been inserted into the stationary frame;

FIG. 6 is a side view showing the apparatus in a position wherein the intermediate section is fitted between the upper and the lower sections.

Figure 1:
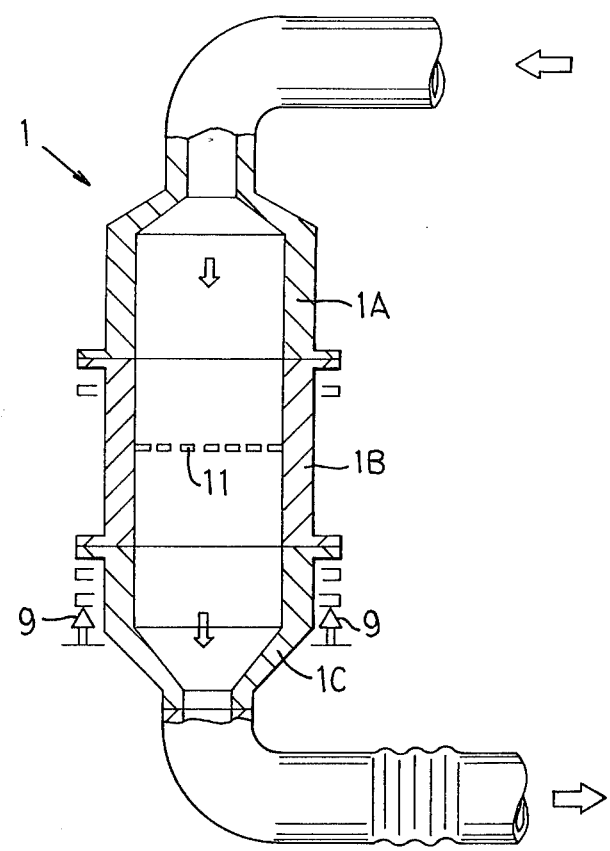
FIG. 1 is a diagrammatic vertical sectional view of a vertical grate furnace according to the present invention.

According to the invention, there is provided a vertical grate furnace 1 which is divided into three separate sections, e.g. an upper section 1A, an intermediate section 1B and a lower section 1C, as shown in FIG. 1.

The upper section 1A is fixedly supported by a stationary frame 2, which frame has sufficient internal space to receive the intermediate section 1B and the lower section 1C and the supports therefor, and which frame is completely open on one side to provide an entrance or portal, as shown in FIG. 2 and FIG. 3.

The intermediate section 1B of the furnace is placed on a movable support 3, which is reciprocable, through the side entrance provided by the frame 2, between a position located within the frame and directly below the upper section 1A and a position located sidewardly from the upper section 1A and the frame.

More specifically, a pair of rails 4 are provided on the base, which rails extend from said sideward position into the interior of the frame 2. The lower part of the movable support 3 is provided with wheels 5 adapted to run on the rails 4.

The movable support 3 is shaped to straddle the lower section 1C, and is high enough to provide a clearance $h_1$, between the top surface of the intermediate section 1B and the bottom surface of the upper section 1A, as shown in FIG. 5 and FIG. 6. Moreover, positioning guide rollers 6 project from both sides of the movable support 3, that is, on the sides of the support that are parallel to the rails 4 as shown in FIG. 4. The inner walls of the frame 2, that are parallel to the rails 4, are provided with positioning guide rails 7 at positions which correspond to the positioning guide rollers 6. Positioning stoppers 8 (FIG. 4) are also mounted on the inner wall of the frame 2 facing the open side thereof, and are used to position the intermediate section 1B. The rollers 6, rails 7 and stoppers 8 cooperate to position the intermediate section 1B inside the frame 2 in vertical alignment with sections 1A and 1C.

The lower section 1C of the furnace is vertically movably supported on a lower stationary support 10 by a lift mechanism 9. The lift mechanism 9 can be a worm gear jack, an oil pressure jack, a pneumatic jack or the like.

The lower support 10 and lower section 1C are shaped so that they can be positioned beneath and within the movable support 3. The lower section 1C of the furnace is supported on the lower support 10 in such a manner that a clearance $h_2$ is provided between the top surface of the lower section 1C and the bottom surface of the intermediate section 1B when said lower section is in its lowermost position. Accordingly, the vertical distance through which the lower section 1C is capable of being movable by the lift mechanism 10 is $h = h_1 + h_2$.

With such an arrangement, the operation is carried out by the following sequence of steps:

(1) After discharging material from a previous pretreatment process from the vertical grate furnace 1, the lower section 1C is lowered through the distance h. Accordingly, the intermediate section 1B is thereby moved vertically downwardly away from the upper section 1A until the intermediate section 1B rests on support 3, following which the lower section 1C moves downwardly away from the intermediate section 1B.

(2) The movable support 3, which now supports the intermediate section 1B, is withdrawn from the interior of the frame 2 along the rails 4 in an outward direction lateral to the furnace (to the left in FIG. 3). The raw materials to be treated then are placed onto the grate 11 of the intermediate section 1B.

(3) The movable support 3 is then moved into the interior of the frame 2 along the rails 4 (to the right in FIG. 3) so that the intermediate section 1B is again interposed between the upper section 1A and the lower section 1C. The intermediate section 1B is positioned in coaxial vertical alignment with the upper section 1A and the lower section 1C by means of the rollers 6, the rails 7 and the stoppers 8.

(4) The lower section 1C and the intermediate section 1B are lifted by the lifting device 9 so that the intermediate section 1B is integrally held between the upper section 1A and the lower section 1C to form a unitary furnace. While the furnace sections 1A, 1B and 1C are held in this position, the raw materials, for example, iron ore raw materials, are subjected to a prereducing heating operation.

Figure 7A:
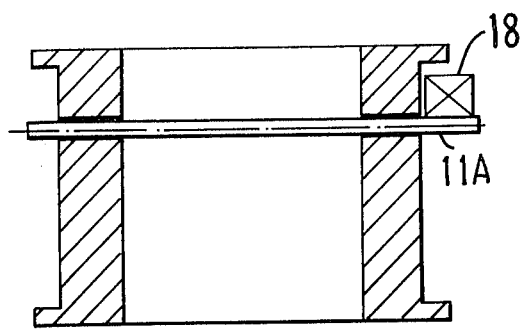
FIG. 7A is a sectional front view of the intermediate section.
Figure 7B:
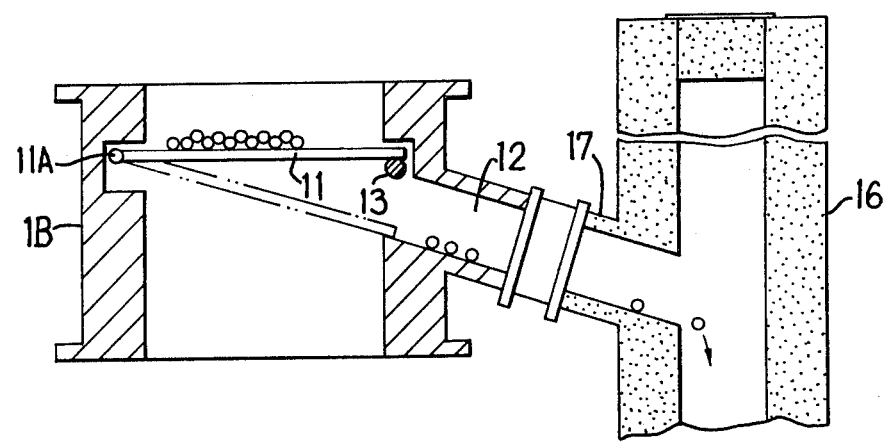
FIG. 7B is a sectional side view of the intermediate section.

Subsequently the prereduced materials are discharged from the intermediate section 1B through an outlet port 12 which projects outwardly and downwardly from the side wall of the intermediate section 1B. One end 11A of the grate 11 is pivotally supported so that the grate 11 can be tilted downwardly to discharge the materials, as shown in FIG. 7. A removable support rod 13 supports the grate in a horizontal position and it is removed when the grate is to be tilted.

A vibrator 18 can be provided in association with the grate 11 in order to completely remove any residual materials.

In the above embodiment, the arrangement is such that the lower section 1C is moved vertically by the lifting mechanism 10. However, it is within the scope of the invention to move the upper section vertically or to move both of the upper and lower sections vertically.

As described above, the present invention makes it possible to provide a relatively simple arrangement for a rapid, easy and precise feeding operation. The present invention is adapted to discharge the prereduced materials from the intermediate section 1B into a container. For example, a movable container 15 (FIG. 6) can be connected in a gastight manner to the outlet port 12 and said container can be filled with inert gas. The present invention is also adapted for the transfer of the preheated materials directly from the vertical furnace of the invention to a rotary furnace for secondary treatment of the materials, particularly in an iron reduction process. To accomplish this, a self-propelled (or mobile) rotary furnace 16 is positioned so that the inlet 17 of the rotary furnace is connected directly to the outlet part 12 of the vertical furnace. Further details concerning such rotary furnace will be found in U.S. patent application Ser. No. 347,652, filed Feb. 10, 1982 (Inventor: Yukio Koyabu; Title: METHOD OF DISCHARGING MATERIAL FROM A ROTARY FURNACE; corresponding to Japanese patent application Ser. No. 24043/1981, filed Feb. 20, 1981;), the entire contents of which are incorporated herein by reference. In particular, the container or the rotary furnace can be connected with outlet port 12 using the openable and closable closure device illustrated in said patent application.

What is claimed is:

1. A method of treating raw material in an iron ore reduction process, in a grate furnace comprised of a first furnace section having a tiltable grate therein and a second furnace section which is vertically movable relative to said first furnace section, said first furnace section being movable sidewardly relative to said second furnace section between a first position located sidewardly of said second furnace section and a second position located in vertical alignment with said second furnace section, which method comprises the steps of feeding raw iron ore material onto the grate of said first furnace section while said first furnace section is in said first position, then moving said first section from said first position to said second position, then moving said second furnace section vertically into tight engagement with said first furnace section so as to hold said first and second furnace sections in a gastight relationship, heating said raw material to effect preliminary treatment thereof, and then tilting said grate to discharge said material from said grate furnace through an outlet provided on the side wall of the furnace.

2. A method of treating raw material comprising the steps of feeding raw material onto an intermediate, grate-containing, furnace section, which intermediate furnace section is separate from an upper furnace section and a lower furnace section of a vertical grate furnace, said intermediate furnace section being supported on a self-propelled movable support wagon movably mounted on a pair of rails; moving said self-propelled movable support wagon so that said intermediate furnace section enters a space between said upper and lower furnace sections; fitting said intermediate section with said upper and lower furnace sections by effecting relative vertical movement between said upper and lower furnace sections so as to maintain gastight conditions between said intermediate furnace section and said upper and lower furnace sections; then preheating said raw material; and then tilting said grate to discharge said material from the grate furnace through an outlet provided on the side wall of said furnace.

3. A method of treating raw material as set forth in claim 1 or claim 2, wherein said grate is vibrated by a vibrator mounted on said grate in order to discharge said material completely during the step of tilting said grate to discharge said material from said grate furnace.

4. A method of treating raw materials as set forth in claim 1 or claim 2, further comprising the steps of disposing a movable container in the vicinity of said grate furnace; connecting the discharge outlet of said grate furnace to said container under gastight conditions; and discharging said material into said container from said grate furnace upon completion of said preheating step.

5. A method of treating raw materials as set forth in claim 1 or claim 2, further comprising the steps of moving a self-propelled rotary furnace adapted to effect chemical reduction of material to a position adjacent said grate furnace; connecting the discharge outlet of said furnace to the material inlet of said rotary furnace under gastight conditions; and discharging said material into the rotary furnace from said intermediate section upon completion of said preheating step.

6. A vertical grate furnace for treatment of raw material comprising: first wall means defining a vertically upper furnace section, second wall means defining a vertically intermediate furnace section, said intermediate furnace section containing a grate adapted to hold said raw material, third wall means defining a vertically lower furnace section, said upper, intermediate and lower furnace sections being mateable with each other to form a unitary furnace having an internal treatment chamber; a stationary frame fixedly supporting said upper furnace section, said stationary frame being open along one side thereof below said upper furnace section and having an internal zone located below said upper furnace section for receiving therein said intermediate furnace section and said lower furnace section; a movable carriage for supporting said intermediate furnace section, said intermediate furnace section being liftable off said carriage, said movable carriage being horizontally movable through said one open side of said frame between a first position in which said intermediate furnace section is located in said zone directly below said upper furnace section and a second position in which said intermediate furnace section is located outside said frame while supporting said intermediate furnace section thereon; a lower support disposed in said zone and supporting said lower furnace section in vertical alignment with said upper furnace section and in vertical alignment with and below said intermediate furnace section when it is in its first position, and vertically movable lifting means on said lower support and engageable with said lower furnace section to raise said lower furnace section and said intermediate furnace section into mating relationship with each other and with said upper furnace section so that said upper, intermediate and lower furnace sections form the unitary furnace.

7. A vertical grate furnace having a central vertical axis for treatment of a raw material in said furnace, comprising:

first wall means defining a hollow, vertically lower furnace section which is open at opposite vertical ends thereof;

second wall means defining a hollow, vertically intermediate furnace section which is open at opposite vertical ends thereof and is adapted to be placed on top of and coaxial with said lower furnace section when said furnace is in operation for treating said raw material, said intermediate furnace section having an outlet spout formed thereon which extends laterally and downwardly through said second wall means;

a grate adapted to hold said raw material thereon, said grate being pivotally mounted at one edge thereof within said intermediate section above said outlet spout, whereby said grate can be pivoted upon completion of treatment of said material into alignment with said outlet spout so that said raw material can flow laterally and downwardly off of said grate and out of said intermediate section through said outlet spout;

third wall means defining a hollow, vertically upper furnace section which is open at opposite ends thereof and is adapted to be placed on top of and coaxial with said intermediate furnace section when said furnace is in operation;

a stationary support frame including a plurality of first, vertically extending support legs connected to said upper furnace section for fixedly supporting said upper furnace section, said stationary support frame being open along one side thereof between two of said first legs and having an internal zone therein to receive said intermediate section and said lower section, said lower section being mounted in said internal zone in vertical alignment with and vertically downwardly spaced from said upper section, said intermediate section being receivable between said upper and lower sections;

a horizontally movable wagon adapted to movably support said intermediate furnace section, said wagon comprising a horizontal frame on which said intermediate section can be supported so that said intermediate section can be lifted off said wagon, and a plurality of second, vertically extending legs having rollers at the bottom ends thereof which movably support said horizontal frame, said movable wagon being movable through said one open side of said stationary support frame between a first position in which it is located directly below said upper furnace section and a second position in which it is located outside of said support frame; and a jack mechanism positioned beneath said lower furnace section, said jack mechanism having vertically movable means supporting said lower section thereon so that said lower section can be raised and lowered vertically, whereby said lower section is reciprocable between a lowermost position wherein said lower, intermediate and upper furnace sections are vertically spaced apart from each other, such that said intermediate section can be moved on said wagon out of coaxial alignment with said upper and lower sections, and an uppermost position at which said furnace sections are vertically stacked to form an interior furnace chamber in which the treatment of said raw material is carried out when said furnace is in operation.

* * * * *